United States Patent [19]

Terragni

[11] Patent Number: 4,922,620

[45] Date of Patent: May 8, 1990

[54] DEVICE FOR DETERMINING THE INCLINATION OF A PLANE WITH RESPECT TO THEORETICAL HORIZONTAL PLANE

[76] Inventor: Ezio Terragni, Via Agnesi 13, 20030 Boviso Masciago (Province of Milano), Italy

[21] Appl. No.: 194,599

[22] Filed: May 16, 1988

[30] Foreign Application Priority Data

May 20, 1987 [IT] Italy ............... 20605 A/87

[51] Int. Cl.$^5$ .................................... G01C 9/06
[52] U.S. Cl. .................................. 33/366; 33/1 N; 33/1 L; 250/231.14
[58] Field of Search ............ 33/366, 1 N, 1 L; 250/231 SE

[56] References Cited

U.S. PATENT DOCUMENTS

| | | | |
|---|---|---|---|
| 2,747,797 | 5/1956 | Beaumont | 33/1 L |
| 3,233,235 | 2/1966 | Wright | 33/366 |
| 3,584,387 | 6/1971 | Sturm | 33/366 |
| 4,159,577 | 7/1979 | Bergkvist | 33/366 |
| 4,253,242 | 3/1981 | McInerney | 33/366 |
| 4,467,527 | 8/1984 | North et al. | 33/366 |
| 4,492,029 | 1/1985 | Tanaka et al. | 33/366 |
| 4,500,392 | 2/1985 | Slaten | 204/5 |
| 4,606,133 | 8/1986 | Mills | 33/366 |
| 4,716,534 | 12/1987 | Baucom et al. | 33/366 |
| 4,964,584 | 9/1987 | Mills | 33/366 |

FOREIGN PATENT DOCUMENTS

| | | | |
|---|---|---|---|
| 0168150 | 1/1986 | European Pat. Off. | 33/366 |
| 3512133 | 11/1985 | Fed. Rep. of Germany | 33/366 |
| 0104212 | 8/1981 | Japan | 33/366 |
| 0153115 | 9/1983 | Japan | 33/1 N |
| 2158230 | 11/1985 | United Kingdom | 33/366 |

Primary Examiner—Thomas B. Will
Attorney, Agent, or Firm—Guido Modiano; Albert Josif

[57] ABSTRACT

The present invention relates to a device for determining the inclination of a plane with respect to a theoretical horizontal plane, including a box-like body defining a base plane. An inclination detector element is rotatably associated with the box-like body; light detectors determine the position of the detector element with respect to the base plane; a display indicates the inclination of the base plane relatively to a theoretical horizontal plane. The light detector and the display are powered by batteries and operated by a switch.

5 Claims, 1 Drawing Sheet

U.S. Patent
May 8, 1990
4,922,620
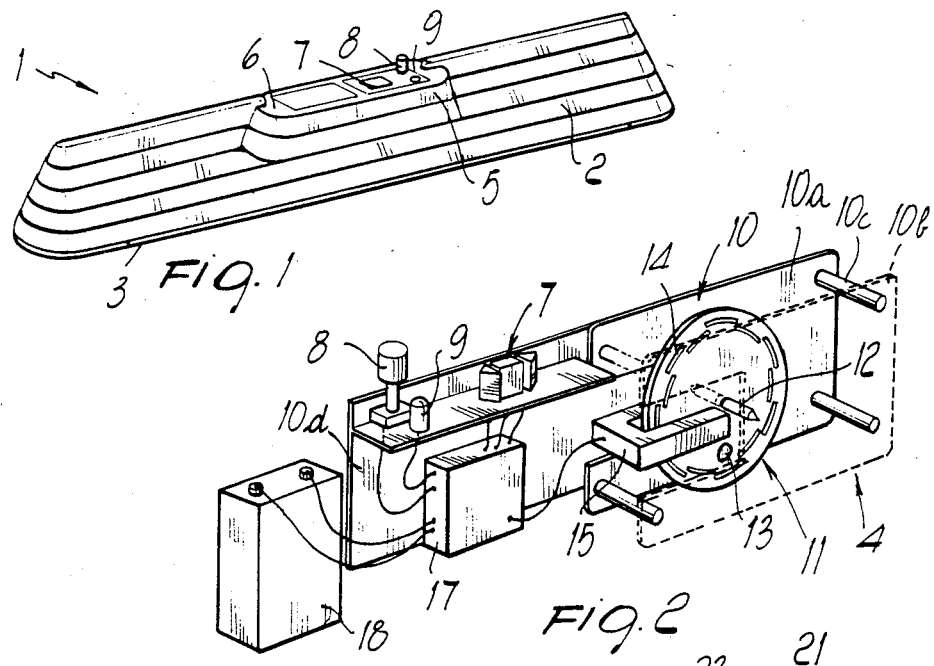
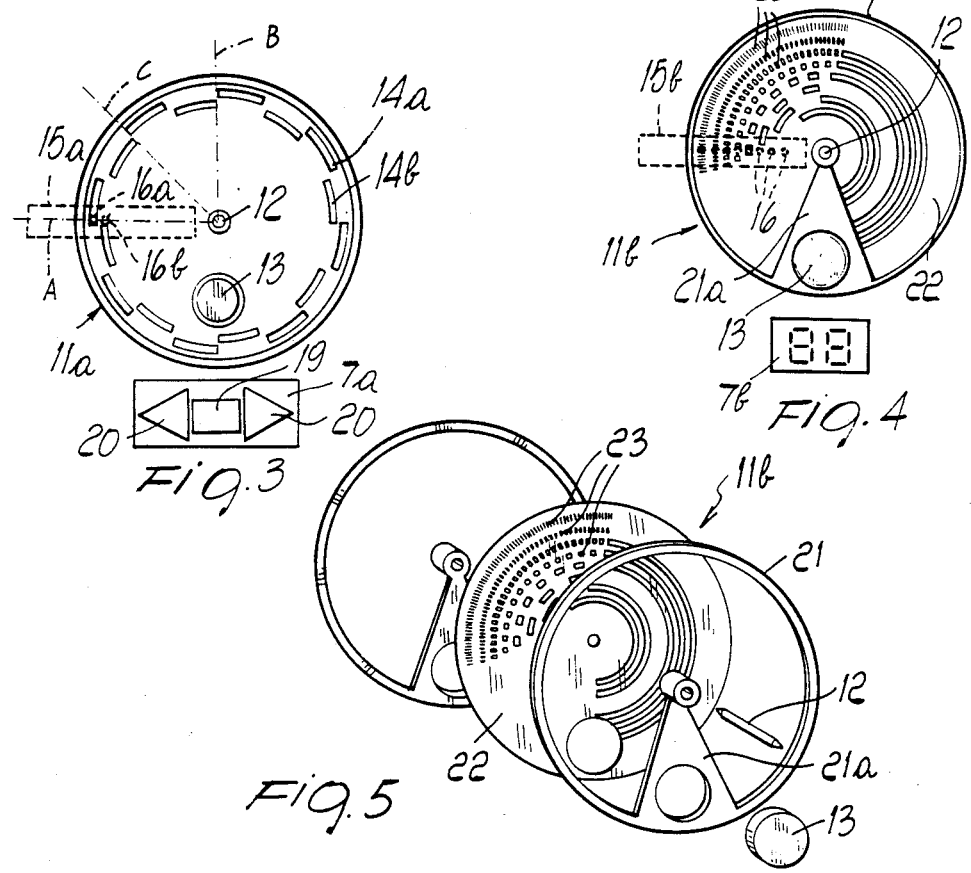

DEVICE FOR DETERMINING THE INCLINATION OF A PLANE WITH RESPECT TO THEORETICAL HORIZONTAL PLANE

BACKGROUND OF THE INVENTION

The present invention relates to a device for determining the inclination of a plane with respect to a theoretical horizontal plane.

Devices adapted to determine the horizontality of a straight line, commonly termed levels or spirit levels since spirit containing a bubble has the main role in the action of these devices, are known.

A level is essentially constituted by a glass tube supported by a frame variously shaped according to the use for which the level is intended. The tube has two etched graduations, symmetrical with respect to a center or normal point, and is almost completely filled with a liquid with extremely low internal friction; inside the tube there is, therefore, a bubble of air or even merely of saturated vapor of the liquid.

The position of the bubble with respect to the graduations provides the indication of the degree of inclination of the level; the bubble is centered when its edges are symmetrical with respect to the center.

In practice the axis of the tube must be curved and therefore it is a portion of a ring (torus); to optimize the degree of sensitivity of the level, the radius of the torus must be very large, so that in practical execution it is convenient to start with a cylindrical glass tube and provide therein, by "grinding" the glass, the required toroidal space.

Despite the fact that spirit levels have always proved their good operation even for high-precision measurements, it is evident that they require a very accurate machining of their components and therefore have high production costs, often not justified especially regarding commonly used levels. The supporting frame of the glass tube, which also defines the base line of the level, must furthermore be very strong, and therefore heavy, to protect the glass tube and to avoid deformations which would be detrimental to the accuracy of the measurement.

SUMMARY OF THE INVENTION

The aim of the present invention is to provide a device for determining the inclination of a plane with respect to a theoretical horizontal plane which combines high precision in measurement with simplicity in execution so as to make it reliable in use and economical from a productive point of view.

Within this aim, an object of the invention is to provide a light and sturdy portable device which maintains its measurement accuracy unchanged in the course of time.

Another object is to provide a device obtainable using materials and components commonly available on the market, to the full advantage of economy in production.

Still another object of the invention is to provide a device which is easy to use in any condition as well as easy to read even for inexpert users.

Finally, another object is to provide a device which combines with its functionality an aesthetically pleasing and modern appearance.

This aim, as well as these and other objects which will become apparent hereinafter, are achieved by a device for determining the inclination of a plane with respect to a theoretical horizontal plane, comprising a box-like body defining a base plane, characterized in that it comprises an inclination detector element rotatably associated with said box-like body, electronic means for reading the position of said detector element with respect to said base plane, means for displaying said position to determine the inclination of said base plane, means being furthermore provided for supplying power to said readout means and said display means.

BRIEF DESCRIPTION OF THE DRAWINGS

Further characteristics and advantages of the invention will become apparent from the description of a preferred but not exclusive embodiment of the device according to the invention, illustrated only by way of non-limitative example in the accompanying drawings, wherein:

FIG. 1 is a perspective view of the device according to the invention in operating conditions;

FIG. 2 is a schematic perspective view of the component elements of the electronic system;

FIG. 3 is a lateral elevation view of a disk according to a first aspect of the invention;

FIG. 4 is a lateral elevation view of a disk according to another aspect of the invention.

FIG. 5 is an exploded perspective view of the disk, showing both symmetrical parts and the film.

DESCRIPTION OF THE PREFERRED EMBODIMENTS

With reference to the above described figures, the device for determining the inclination of a plane with respect to a theoretical horizontal plane, or level, generally indicated by the reference numeral 1, comprises a box-like body 2 preferably made in plastic material by molding and having a planar base 3 adapted to be placed on the surface of the plane the inclination whereof is to be determined.

The box-like body 2 contains, in its interior, the detection core 4 at a central portion 5 of said box-like body. The central portion 5 has a planar upper surface 6 at which there are arranged a display 7 for the readout of the data and a pushbutton 8, coupled to the control indicator 9, for switching on and off the level which, as described hereinafter, is electronically operated.

The detection core 4 comprises a frame 10, supporting the various components of said core, and constituted by two plates 10a and 10b, mutually parallel and connected by rods 10c, and by a plane 10d substantially co-planar to the plate 10a.

The frame 10 supports an inclination detector element preferably constituted by a disk 11 having a pivot 12 with its ends rotatably associated respectively to the plates 10a and 10b. The disk 11 has a weight 13, for example constituted by a small lead disk, fixed at a point proximate to the perimeter of the disk; as the disk 11 is rotatably associated with the frame 10 according to an axis perpendicular to the longitudinal extension of the level and parallel to the planar base 3, the weight 13 forces the disk 11 in a plumb position regardless of the inclination of the base of the level with respect to the horizontal. To facilitate the rotation of the disk 11 with respect to the frame 10, i.e. to ensure that the disk 11 always have the abovesaid position even with minimal inclinations of the level, it is convenient that there be the minimum possible friction between the pivot 12 and the supporting seats on the plates 10a and 10b.

The disk 11 has reference elements 14 which, as will be described hereinafter, indicate to readout means, fixed to the frame 10, the position of the disk 11 relatively to said frame 10 and therefore to the base plane 3 of the level. The readout means are substantially constituted by one or more light detectors 16 arranged on a fork-like supporting element 15 fixed to the frame 10 so as to arrange the two elements of each single light detector (i.e. the lamp and the photocell) on the opposite sides of the disk 11. The light detectors 16 are electrically connected to an electric circuit 17, also fixed to the frame 10 and in turn connected to the display 7. The power supply for the circuit 17, the display 7 and the light detectors 16 is provided by a power source advantageously constituted by a standard dry battery 18 placed in the box-like body 2 in an adapted seat, not illustrated for the sake of simplicity. In a per se known manner, not illustrated for the sake of clarity, the battery 18 is accessible for its replacement by means of an appropriate removable cover at the seat of the battery in the box-like body.

Advantageously, a switch 8 with related control indicator 9 is provided for the actuation of the electric circuit, arranged in an easily accessible position outside the box-like body.

Advantageously, the display 7, the switch 8 and the indicator 9 are fixed to the frame 10 and are accessible from the outside of the box-like body 2 by means of appropriate openings provided on the surface 6 of the central portion 5; said openings are furthermore preferably provided so as to prevent dirt and humidity from penetrating inside the box-like body and damaging the device, compromising its functionality.

FIGS. 3 and 4 schematically illustrate two different examples of execution of the device, and in particular of the disk and of the corresponding display, as well as of the reference elements on the disk itself.

FIG. 3 illustrates a disk 11a and a corresponding display 7a according to a simplified version of the device, wherein the reference elements 14 are constituted by two separate series of openings 14a and 14b arranged substantially along circular crowns provided proximate to the perimeter of the disk for the entire arc of 360°. Radially to the disk 11a the light detectors 16a and 16b are arranged on the support element 15a and respectively "read" the series 14a of the outer circular crown and the series 14b of the inner circular crown. The light detector 16a detects, on the corresponding circular crown 14a, the presence or not of an opening and the light detector 16b simultaneously does the same on the corresponding circular crown 14b.

Therefore, by approximately combining the openings or slots along the circular crowns it is possible to determine a readout code which indicates the position of the disk with respect to the frame and therefore, the disk being always plumb, the inclination of the level.

For example, in the case illustrated in FIG. 3, when the light detectors both detect an opening, the central indicator 19 lights on the display 7a; when one light detector detects an opening and the other light detector detects an opaque region, one or the other of the lateral indicators 20 lights up depending on whether the opening is detected by the inner light detector or by the outer one. In particular, when the level is perfectly horizontal, the central indicator 19 lights up (light detectors in positions A with respect to the disk), the lateral indicators 20 indicate instead a rightward or leftward inclination of the level. In practice the disk 11a illustrated in the figure allows to determine, always by means of the lighting of the central indicator 19, the vertical (position B) and an inclination of 45° with respect to the horizontal (position C) and related rightward and leftward inclinations with respect to these positions by means of the lighting of one or the other of the indicators 20.

This type of execution of the level offers considerable practical advantages; first of all the circuit 17 for processing the data received from the light detectors 16 is very simple, furthermore the disk 11a is easily obtainable by injection molding in plastic material. The level is thus very reliable and extremely economical from the manufacturing point of view.

FIG. 4 illustrates a disk 11b and the corresponding digital display 7b capable of providing the exact angle of inclination of the level with respect to the horizontal. Briefly, the disk 11b is constituted by a supporting structure 21 provided by injection molding, comprising two symmetrically identical half-portions each constituted by a circular crown connected to a sector 21a having the supporting pivot 12 and the weight 13. In the region comprised by the structure 21 there is arranged, fixed between the two half-portions, a film 22 on which a certain number of circular crowns 23 having opaque regions alternated with transparent regions according to a preset pattern is photographically provided.

In the specific case the circular crowns 23 are eight and are read by the same number of light detectors 16 supported on the support element 15b, in a manner similar to what has been described above; more in particular the eight light detectors 16 simultaneously read eight different opaque and transparent regions according to a preset pattern. The electronic circuit 17 comprises a memory capable of reading the binary code determined by the different regions of the circular crowns and of activating the digital display 7b, provided the corresponding indication. The illustrated disk 14b allows for example to measure an inclination of the level with respect to the horizontal comprised between −9° and +99°; the digital display 7b, besides naturally indicating the exact value corresponding to the degree of inclination, notifies the user if the abovesaid limits of the measurement range are exceeded. For the sake of completeness in description it is specified that only seven of the eight circular crowns constitute the actual code, while the eighth is a memory parity check.

The operation of the level, both of the simplified type and of the digital-display type, is very simple; it is in fact sufficient to place the level on the plane the inclination whereof is to be measured and press the pushbutton 8 to activate the electric circuits; the luminous display immediately provides the required indication, possibly after waiting for a few seconds for any oscillations of the disk to dampen. In rapidly dampen the possible oscillations of the disk it is possible to provide the level with a damper, not illustrated in the drawings, for example constituted by a pushbutton accessible from outside and connected inside the box-like body to a felt acting by contact on the disk only when the pushbutton is depressed.

In practice it has been observed that the device according to the invention fully achieves the intended aim, since it allows to provide a reliable and precise level with a considerably reduced production cost.

Another advantage is due to the extreme practicality in use due to the low weight, to the strength and to the ease in reading the display.

The device thus conceived is susceptible to numerous modifications and variations, all of which are within the scope of the inventive concept; furthermore all the details may be replaced with technically equivalent elements.

In practice, the materials employed, as well as the dimensions, may be any according to the requirements and to the state of the art.

What is claimed:

1. Device for determining the inclination of a plane with respect to a theoretical horizontal plane comprising a box-like body defining a base plane, an inclination detector element rotatably associated with said box-like body, said detector element defining an angular position with respect to said body and to said base plane, electronic readout means for reading said position of said detector element with respect to said base plane, means for displaying said position to determine the inclination of said base plane, means being furthermore provided for supplying power to said read means and said display means; said inclination detector element comprising a disk rotatably associated with said box-like body according to a rotation axis substantially parallel to said base plane and substantially perpendicular to a longitudinal axis of said base plane, said disk having an eccentrical mass so that by varying the inclination of said longitudinal axis of said base plane relatively to said theoretical horizontal plane said disk rotates relatively to said box-like body about said axis of rotation without rotating relatively to said theoretical horizontal plane;

said readout means comprising circular crowns provided on said disk and having an alternation of regions opaque and transparent to light, at each of said circular crowns there being provided light detector means rigidly associated with said box-like body and electrically connected to an electronic circuit associated with said box-like body, said light detector means cooperating with said circular crowns and said electronic circuit to determine the position of said disk relatively to said base plane; said disk comprising a support provided in plastic material by injection molding, composed of two symmetrically identical parts, each of said parts comprising an outer circular crown connected to a sector supporting a pivot coinciding with said axis of rotation and furthermore supporting said eccentrical mass, in the region comprised between said outer circular crown and said sector there being provided a photographic-type film between said two symmetrically identical parts.

2. Device according to claim 1, wherein said display means comprise a central indicator adapted to indicate a centering position and first and second lateral indicators adapted to respectively indicate a rightward of leftward inclination of said base plane relatively to said centering position.

3. Device according to claim 1, wherein said display means are constituted by a digital display adapted to numerically indicate the degree of inclination of said base plane.

4. Device according to claim 1, wherein said power supply means comprise one or more batteries accommodated inside said box-like body and accessible from outside, said device further comprising a switch accessible from the outside of said box-like body for the activation of said electronic circuit, there being furthermore provided a control indicator connected to said switch and to said electronic circuit and visible from the outside of said box-like body.

5. Device according to claim 4, wherein said disk, said light detector means, said display means, said electronic circuit, said switch and said control indicator are supported by a frame accommodatable in a central portion of said box-like body, said frame being rigidly associated with said box-like body, said central portion having an upper surface provided with openings for the accommodation of said display means, of said switch and of said control indicator.

* * * * *